United States Patent
Mizuno

(10) Patent No.: US 7,477,680 B2
(45) Date of Patent: Jan. 13, 2009

(54) DE-SPREADER OPERATIVE WITH SELECTABLE OPERATIONAL CLOCK FOR SPREAD SPECTRUM COMMUNICATION AND A METHOD FOR THE SAME

(75) Inventor: Koutaro Mizuno, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 672 days.

(21) Appl. No.: 11/113,178

(22) Filed: Apr. 25, 2005

(65) Prior Publication Data

US 2006/0018370 A1    Jan. 26, 2006

(30) Foreign Application Priority Data

Jul. 26, 2004   (JP)   ............................. 2004-217192

(51) Int. Cl.
H04B 1/00    (2006.01)
(52) U.S. Cl. ..................... 375/150; 375/142; 375/145
(58) Field of Classification Search .............. 375/150, 375/342, 343, 141, 152, 142, 145, 134, 137; 327/19, 42, 49, 147, 153; 455/572, 574, 455/127.1, 127.5, 343.1, 343.5
See application file for complete search history.

(56) References Cited

U.S. PATENT DOCUMENTS

| | | | | |
|---|---|---|---|---|
| 5,214,669 A | * | 5/1993 | Zarembowitch | ............. 375/130 |
| 5,638,362 A | * | 6/1997 | Dohi et al. | .................. 370/342 |
| 2003/0002566 A1 | * | 1/2003 | McDonough et al. | ........ 375/147 |
| 2004/0013172 A1 | * | 1/2004 | Hashiguchi et al. | ......... 375/148 |

FOREIGN PATENT DOCUMENTS

JP    2003-283369    10/2003

* cited by examiner

Primary Examiner—David C Payne
Assistant Examiner—Rahel Guarino
(74) Attorney, Agent, or Firm—Studebaker & Brackett PC; Donald R. Studebaker

(57) ABSTRACT

A de-spreading device for a spread spectrum communication system includes a first and a second correlator assigned to a regular and a power-saving operation mode, respectively. The first correlator performs sampling with a regular operational clock while the second correlator performs sampling with an operational clock higher in rate than the regular operational clock for thereby saving power. The regular or the power-saving operation mode is selected in accordance with radio channel quality estimated on the basis of a peak value detected from a correlation value, which is output from the first or the second correlator. De-spreading can therefore be implemented by an optimum operational clock matching with radio channel quality while consuming a minimum of current.

26 Claims, 6 Drawing Sheets

DE-SPREADER OPERATIVE WITH SELECTABLE OPERATIONAL CLOCK FOR SPREAD SPECTRUM COMMUNICATION AND A METHOD FOR THE SAME

BACKGROUND OF THE INVENTION

1. Field of the Invention

The present invention relates to a de-spreading device applicable to a direct sequence spread spectrum (DS-SS) communication system and operable in a power-saving mode, and a method for the same.

2. Description of the Background Art

It is a common practice with a demodulator for a spread spectrum communication system to compare a signal output from a detector with a preselected threshold value to generate bi-level virtual chip data, which are of (logical) ZERO or (logical) ONE, to in turn execute correlation operation on the virtual chip data by use of a correlator, and then, based on the peak value of a correlation value, to estimate the optimum timing of symbol data decision and detect symbol data.

Japanese patent laid-open publication No. 2003-283369, for example, discloses a correlation detector configured to use a replica spread code to de-spread a digital spread-spectrum received signal with a correlator and then demodulate the resulting signal with a demodulator. More specifically, a matched filter produces a correlation from a digital spread spectrum code sequence while a correlation peak detector detects a correlation peak value out of the above correlation. Subsequently, a synchronous tracing circuit determines, on the basis of the correlation peak value, a timing for generating a replica spread code. In response to the timing thus determined, a replica spread code generator generates a replica spread code. Particularly, the matched filter includes bit-based filter segments each implemented by an Exclusive OR (EX-OR) gate and an adder.

The correlation detector taught in the document mentioned above compares demodulated data not subjected to error correction with demodulated data subjected to error correction bit by bit to thereby determine the number of bit errors, calculates, on the basis of the number of bit errors, a bit error rate with a receipt quality decision circuit, compares the bit error rate thus determined with a preselected threshold value to thereby determine receipt quality, and then selects, based on the determined receipt quality, the bit-based filter portions to be enabled by a search controller. When receipt quality is high, the correlation detector enables only a minimum necessary number of bit-based filter portions capable of detecting a correlation peak higher than the current correlation peak. This condition is held so long as receipt quality is high. It is therefore possible to reduce power consumption by the matched filter, which inherently consumes much more power, to a minimum necessary level.

Generally, the demodulation characteristic of a demodulator can be enhanced if the sampling frequency of a correlator is increased to improve the accuracy of timing for symbol data decision for thereby reducing symbol data decision errors. With such a correlator, a significantly high sampling frequency may not be required in a high C/N (Carrier-to-Noise) ratio environment. In a low C/N ratio environment, however, the sampling rate must be increased to some extent in order to achieve a desired characteristic. In this respect, a conventional demodulator has the following problem left unsolved.

In a conventional demodulator, an operational clock signal input to a correlator has its frequency fixed. The operational clock signal is therefore usually so determined as to satisfy a desired characteristic even when radio channel quality is low, e.g. when sensitivity is at the lowest limit that should be guaranteed. It follows that when radio channel quality is high a demodulator adapted for operating with a preselected operational clock signal without regard to radio channel quality wastefully consumes excessive current.

SUMMARY OF THE INVENTION

It is an object of the present invention to provide a de-spreading device for a spread spectrum communication system operable in a power-saving mode that reduces power consumption more effectively and a method for the same.

A de-spreading device of the present invention includes a comparator for comparing a detection output of a received signal, which is subjected to spectrum spread by a direct sequence system, with a predetermined comparative value to produce virtual chip data. A frequency divider divides the frequency of a master clock signal to generate an operational clock signal. A correlation circuit uses a predetermined spread code to perform correlation operation on the virtual chip data to produce a correlation value. A timing estimator detects a correlation peak value out of the correlation value to produce a timing signal based on the correlation peak value. Further, a decision circuit decides the correlation value in response to the timing signal and then outputs the correlation value as symbol data. With this configuration, the de-spreading device is selectively operable in any one of a plurality of modes including a first mode for regular operation and a second mode lower in power consumption than the first mode. The correlation circuit performs the correlation operation with, in the first mode, a first operational clock signal assigned to the regular operation, and, in the second mode, a second operational clock signal lower in rate than the first operational clock signal.

A de-spreading method for the above device is also disclosed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
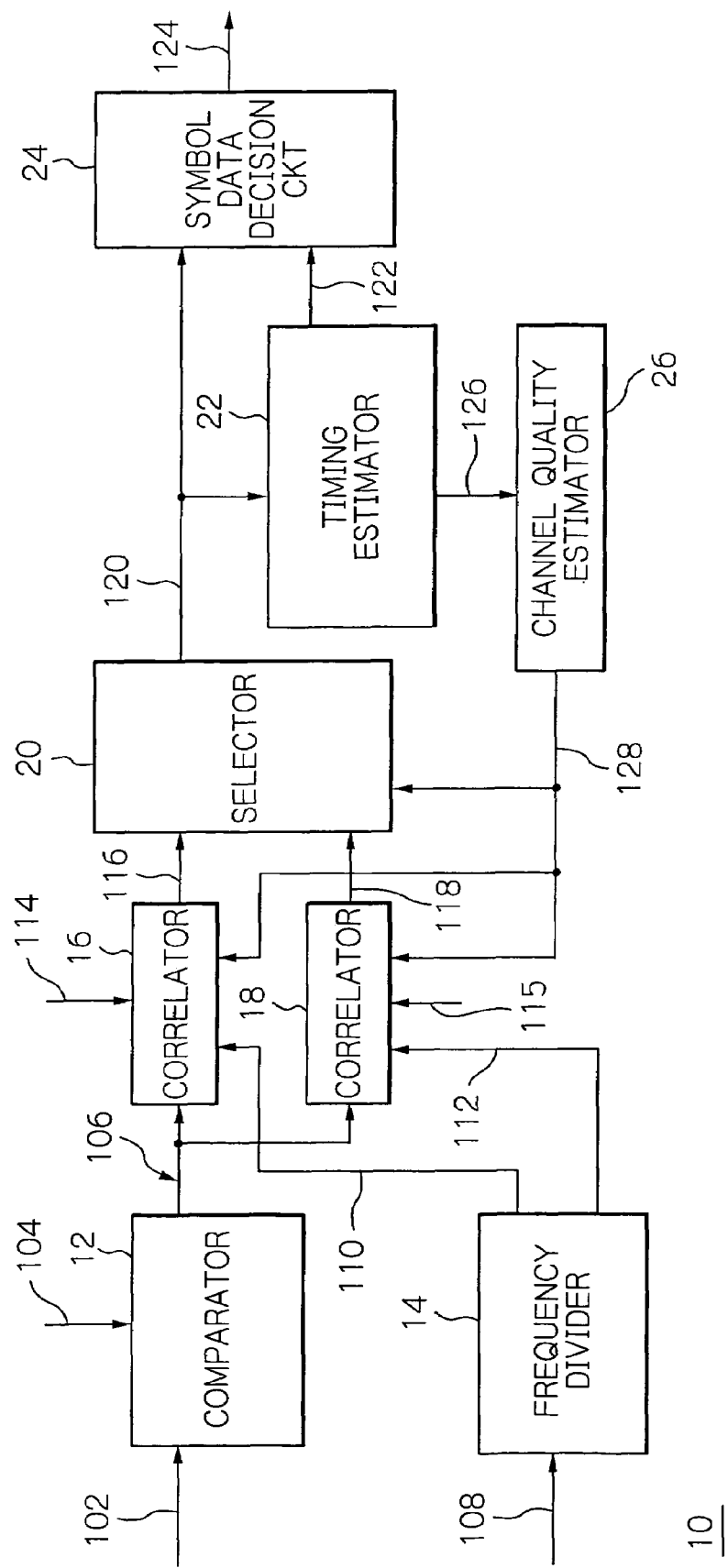
FIG. 1 is a schematic block diagram showing a de-spreading device for a spectrum spread communication system embodying the present invention.

Referring to FIG. 1 of the accompanying drawings, a de-spreading device embodying the present invention is generally designated by the reference numeral 10. Generally, the de-spreading device 10 includes a comparator 12 configured to feed virtual chip data 106 to correlators 16 and 18. Each of the correlators 16 and 18 is also fed with a particular operational clock signal from a frequency divider 14. Either one of the correlators 16 and 18 is selected in response to a mode select signal 128 output from a channel quality estimator 26 and is enabled to perform correlation operation to produce a correlation value. The correlation value thus output from the correlator 16 or 18 is selected by a selector 20. The peak of the correlation value selected by the selector 20 is determined by a timing estimator 22 for thereby estimating an optimum timing for deciding symbol data. A symbol data decision circuit 24 decides symbol data on the basis of the correlation value and optimum timing mentioned above. Further, the channel quality estimator 26 produces an appropriate mode select signal in accordance with the peak of the correlation value.

It should be noted that parts and elements not directly relevant to the understanding of the present invention are not shown, and a detailed description thereof will not be made in order to avoid redundancy.

Whereas the illustrative embodiment shown in FIG. 1 is provided with two correlators 16 and 18 only, the de-spreading device 10 may be provided with a more number of correlators, if desired. In the illustrative embodiment, a mode select signal 128 output from the channel quality estimator 26 is indicative of either one of a regular and a power-saving mode.

Specifically, in the illustrative embodiment, the comparator 12 is adapted to receive a detection signal 102 output from a detector, not shown, and a preselected threshold value 104 and compares the detection signal 102 with the threshold value 104 to determine symbol data to produce the result of comparison in the form of bilevel virtual chip data 106. More specifically, the comparator 12 compares, e.g. an FSK (Frequency Shift Keying) detection signal with a threshold value which is equal to, e.g. its middle point, to produce, as the virtual chip data 106, (logical) ONE if the detection signal is greater than or equal to the threshold value or otherwise (logical) ZERO. The virtual chip data 106 are fed to the correlators 16 and 18.

The frequency divider 14 is adapted to divide the frequency of a master or reference clock signal 108 in matching relation to the number of times of sampling per symbol, i.e. a sampling frequency particular to a correlator. In the illustrative embodiment, the frequency divider 14 divides the master clock signal 108 by numbers, NA and NB, to produce operational clock signals 110 and 112, respectively, and delivers the operational clock signals 110 and 112 to the correlators 16 and 18, respectively.

The correlators 16 and 18 are adapted for using preselected spread codes 114 and 115, respectively, to calculate correlations of the virtual chip data 106 and deliver the resulting correlation values 116 and 118 to the selector 20. The correlators 16 and 18 may each be implemented by respective shift registers 230, FIG. 2, having 1+k×(m−1) consecutive stages 232 arranged, where k and m are representative of the number of times of sampling for one chip and the number of chips assigned to one symbol, respectively. The spread codes 114 and 115 input to the correlators 16 and 18, respectively, may be identical with each other, if desired.

In the illustrative embodiment, the correlators 16 and 18 are adapted to operate in the regular mode and power-saving mode, respectively, and have respective shift registers 230 different in length from each other. For example, the shift register length of the correlator 18 may be one-half of the shift register length of the correlator 16. Either one of the correlators 16 and 18 is made active in response to the mode select signal 128 output from the channel quality estimator 26. In the illustrative embodiment, the correlators 16 and 18 are rendered active and inactive, respectively, when the mode select signal 128 is indicative of the regular mode, or rendered inactive and active, respectively, when the signal 128 is indicative of the power-saving mode. Each of the correlators 16 and 18 may have its enable terminal interconnected for receiving the mode select signal 128.

The selector 20 is adapted to select either one of the correlation values 116 and 118 output from the correlators 16 and 18, respectively, in response to the mode select signal 128 and outputs the selected one as a correlation value 120. For example, the selector 20 selects the correlation value 116 when the mode select signal 128 is indicative of the regular mode, or selects the correlation value 118 when the signal 128 is indicative of the power-saving mode.

The timing estimator 22 is adapted for receiving the correlation value 120 output from the selector 20 to detect symbol by symbol the peak value of the correlation value 120 appearing around a symbol timing. In the illustrative embodiment, the timing at which the peak value appears is delivered from the timing estimator 22 to the symbol data decision circuit 24 as an optimum timing signal 122. Particularly, in the illustrative embodiment, the timing estimator 22 is connected to feed the peak value 126 to the channel quality estimator 26.

The symbol data decision circuit 24 is adapted to decide the input correlation value 120 in response to the optimum timing signal 122 received from the timing estimator 22 and then output the result of decision as symbol data 124. At this instant, the symbol data decision circuit 24 may be adapted to output the symbol data 124 at a timing defined by a self-running symbol clock.

The channel quality estimator 26 is adapted for estimating radio channel quality on the basis of the peak value 126 of the correlation value input from the timing estimator 22 and outputting the mode select signal 128 in accordance with the estimated circuit quality. In the illustrative embodiment, the mode select signal 128 initially output from the channel quality estimator 26 is indicative of the regular mode.

The illustrative embodiment has its number of chips assigned to a single symbol, i.e. a spread ratio set to a predetermined number "11" (eleven) by way of example. Then, the channel quality estimator 26 determines that radio channel quality is high when the correlation peak value 126 is "11". Further, when such high radio channel quality continues over a period of time corresponding to a preselected number of consecutive symbols, the channel quality estimator 26 determines that the radio channel quality is significantly high, and then replaces the regular mode represented by the mode select signal 128 with the power-saving mode. Subsequently, in the power-saving mode, as soon as the correlation peak value 126 decreases below a preselected lower limit or threshold value, the channel quality estimator 26 determines that the radio channel quality has become low, and again switches the mode select signal 128 from the power-saving mode to the regular mode.

Figure 2:
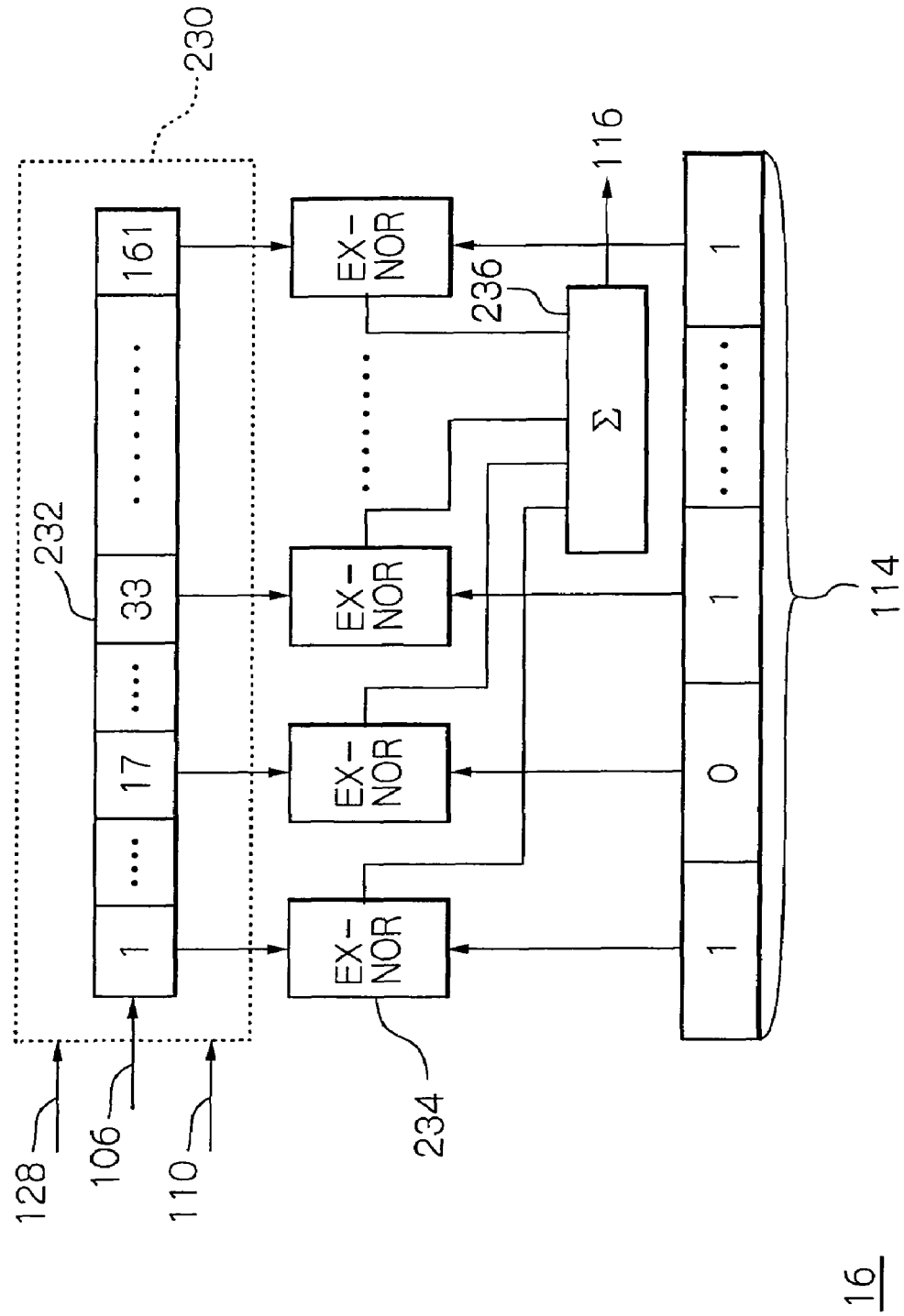
FIG. 2 is a schematic block diagram showing a correlator included in the illustrative embodiment shown in FIG. 1 and enabled in a regular mode.
Figure 3:
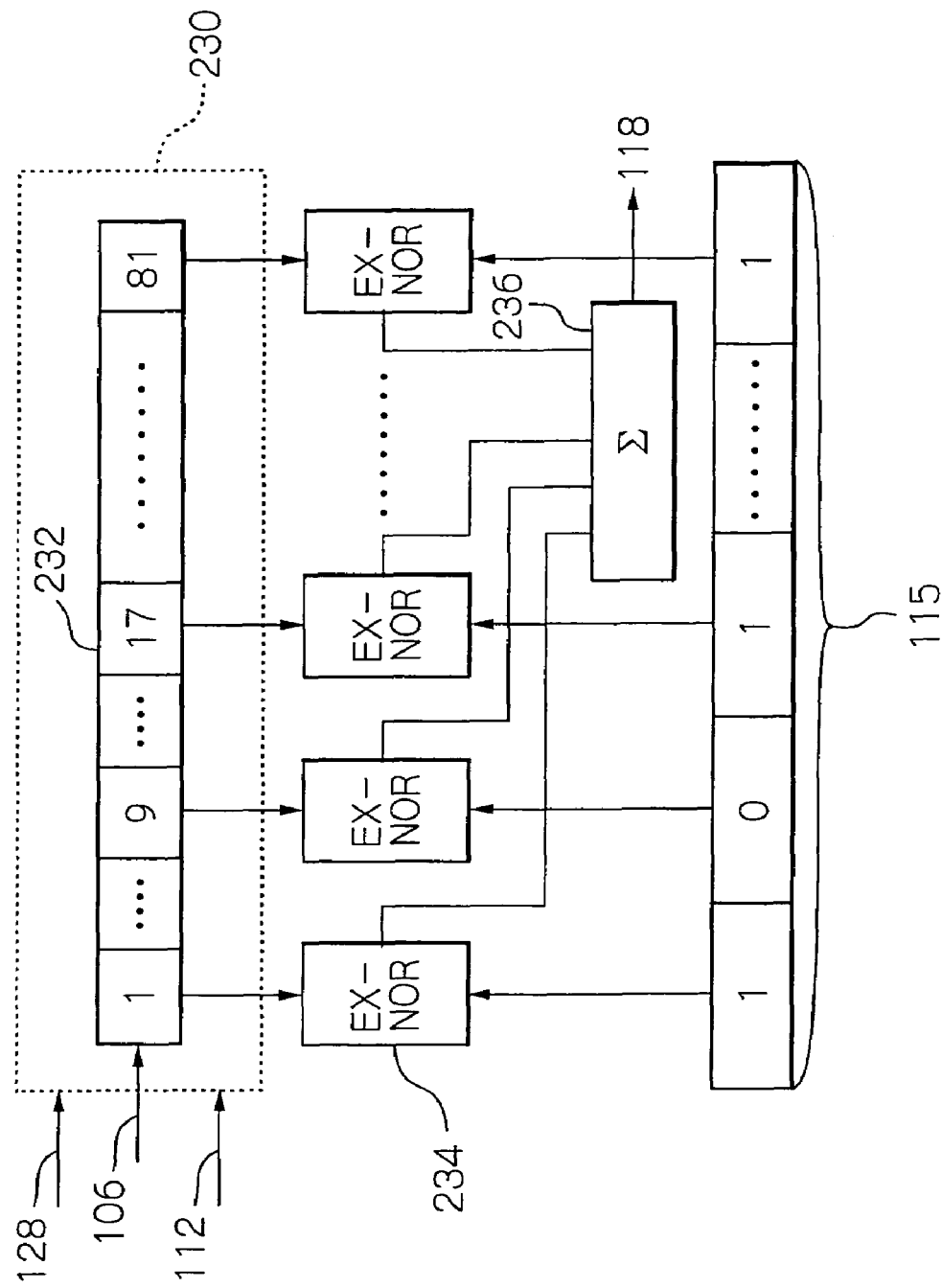
FIG. 3 is a schematic block diagram showing a correlator included in the illustrative embodiment and enabled in a power-saving mode.

A specific operation of the de-spreading device 10 will be described hereinafter with the correlators 16 and 18 each implemented by 1+k×(m−1) stages 232 of the shift register 230 mentioned earlier. In the procedure to be described, m is assumed to be "11". Further, with the specific configuration of the illustrative embodiment, the correlators 16 and 18 are implemented, where k is "16" and "8", by one hundred and sixty-one (161) consecutive stages 232 of the shift register 230 and eighty-one (81) consecutive stages 232 of the shift register 230, respectively, as shown in FIGS. 2 and 3.

First, a detection signal 102 output from the detector, not shown, is fed to the comparator 12 and compared with a preselected threshold value 104 thereby. In response, the comparator 12 outputs virtual chip data 106 which are ONE if the detection signal 102 is greater than or equal to the threshold value 104 or ZERO otherwise. The virtual chip data 106 are fed to the correlators 16 and 18. At this stage of operation, in the comparator 12, the virtual chip data 106 are not synchronized to the clock of the chip timing yet. At this time, the frequency divider 14 divides the frequency of the input master clock signal 108 and delivers the resulting operational clock signals 110 and 112 to the comparators 16 an 18, respectively. For example, to output the operational clock signals 110 and 12, the frequency divider 14 divides the frequency of the master clock signal 108 in accordance with the numbers k of times of sampling or sampling frequencies that are "16" and "8", respectively.

Subsequently, either one of the correlators 16 and 18 is selected in response to the mode select signal 128 output from the channel quality estimator 26 and operates under the control of the operational clock signal 110 or 112, respectively. Initially, the mode select signal 128 is indicative of the regular mode and renders the correlators 16 and 18 active and inactive, respectively.

The correlator 16 thus enabled determines a correlation between the consecutive virtual chip data 106 and the spread code 114. More specifically, in the regular mode, all the 1+16×(m−1) stages 232 of the shift register 230 shown in FIG. 2 are enabled to sample the virtual chip data 106 at a sixteen times higher sampling rate. On the other hand, the other correlator 18 disabled does not operate. In the illustrative embodiment, the correlators 16 and 18 may each be configured to oversample a single chip so as to determine a chip timing on the basis of the resulting data.

In the illustrative embodiment, in the correlator 16, eleven chips of the virtual chip data stored in the "1+16×(n−1)"-th shift register stage (n being 1, 2, . . . , 11) each are Exclusive-NORed (EX-NORed, 234) with corresponding part of the spread code 114. The sum total (236) of such correlation operations is fed from the correlator 16 to the selector 20 as a correlation value 116. The correlation value 116 output is "μl", which is greatest, if all the virtual chip data 106 are identical with the spread code 114, or is "0", which is smallest, if none of the former is identical with the latter. In this manner, the correlation value output from the correlator 16 increases with an increase in the number of chips identical with the spread code 114. This is also true with the other correlator 18.

The mode select signal 128 input to the selector 20 is indicative of the regular mode also. Therefore, the selector 20 selects the correlation value 116 output from the correlator 16 and delivers it to the timing estimator 22 as a correlation value 120. In response, the timing estimator 22 detects a peak value 126 around the symbol timing out of the correlation value 120. The timing estimator 22 then feeds the timing of the peak value 126 thus detected to the symbol data decision circuit 24 as an optimum timing signal 122 for symbol data decision.

The accuracy of estimation of the timing signal 122 is dependent on the time resolution of the correlator 16 or 18, i.e. the operational clock signal of the shift registers 230 constituting a correlator. More specifically, the correlators 16 and 18 each are allowed to sample the virtual chip data 106 more finely as the operational clock signal 110 or 112, respectively, becomes higher in rate, so that the timing signal 122 detected by the timing estimator 22 is brought closer to the ideal timing. In this manner, by increasing the rate of an operational clock signal input to a correlator, it is possible to improve the demodulation characteristic and therefore to reduce, if radio channel quality is high enough to free chip data from errors, the rate of the operational clock signal without any noticeable influence on demodulation.

The correlation value 120 output from the selector 20 is fed to the symbol data decision circuit 24 as well and decided thereby. The result of decision is output from the symbol data decision circuit 24 as symbol data 124.

The correlation peak value 126 detected by the timing estimator 22 is fed to the channel quality estimator 26. The channel quality estimator 26 estimates radio channel quality on the basis of the peak value 126 and outputs the mode select signal 128 representative of the estimated radio channel quality.

Generally, in a de-spreading circuit for spread spectrum communication, the peak value output from a correlator rises when radio channel quality is high, or falls when it is low. Stated another way, the correlation value per se is representative of the degree of radio channel quality. In the illustrative embodiment, when the peak value 126 continuously indicates the spread ratio of "11" over a preselected number of symbols in the regular mode represented by the mode select signal 128, the channel quality estimator 26 determines that radio channel quality is significantly high, and switches the mode select signal 128 from the regular mode to the power-saving mode.

The mode select signal 126 indicative of the power-saving mode renders the correlators 16 and 18 inactive and active, respectively. In response, the correlator 18 uses the spread code 115 to determine the correlation of the virtual chip data 106. More specifically, as shown in FIG. 3, all the 1+8×(m−1) stages 232 of the shift register 230 are operated in the power-saving mode so as to sample the virtual chip data 106 at an eight times higher chip rate. In the correlator 18, eleven chips of the virtual chip data stored in the "1+8×(n−1)"-th of the shift register 230 (n being 1, 2, . . . , 11) each are EX-NORed (234) with corresponding part of the spread code 115 in the same manner as in the correlator 16. The sum total (236) of the correlation operations is fed from the correlator 18 to the selector 20 as a correlation value 118.

The selector 20 selects the correction value 118 in response to the mode select signal 128 indicative of the power-saving mode and outputs the correction value 118 as a correlation value 120.

On the other hand, when a correlation peak value 126 smaller than the preselected lower limit or threshold is detected while the mode select signal 128 output from the channel quality estimator 26 is indicative of the power-saving mode, the channel quality estimator switches the mode select signal 128 from the power-saving mode to the regular mode.

As stated above, in the illustrative embodiment, the channel quality estimator 26 determines a correlation peak value 126 to estimate radio channel quality, and then selects either one of the regular mode and power-saving mode to be indicated by the mode select signal 128 in accordance with the radio channel quality. Therefore, either one of the correlators 16 and 18 different in operational clock from each other can be selected in response to the mode select signal 128. This successfully accomplishes de-spreading with an optimum operational clock and adequate current consumption matching with instantaneous radio channel quality.

The illustrative embodiment has been shown and described on the assumption that the spread ratio is eleven times and that the sampling frequencies for a single symbol assigned to the regular mode and power-saving mode are sixteen times and eight times, respectively. If desired, the illustrative embodiment may be modified to select a sampling frequency for one symbol as low as, e.g. four times so as to further promote power consumption. Further, the number of modes available with the illustrative embodiment may be increased to implement more delicate control.

Figure 4:
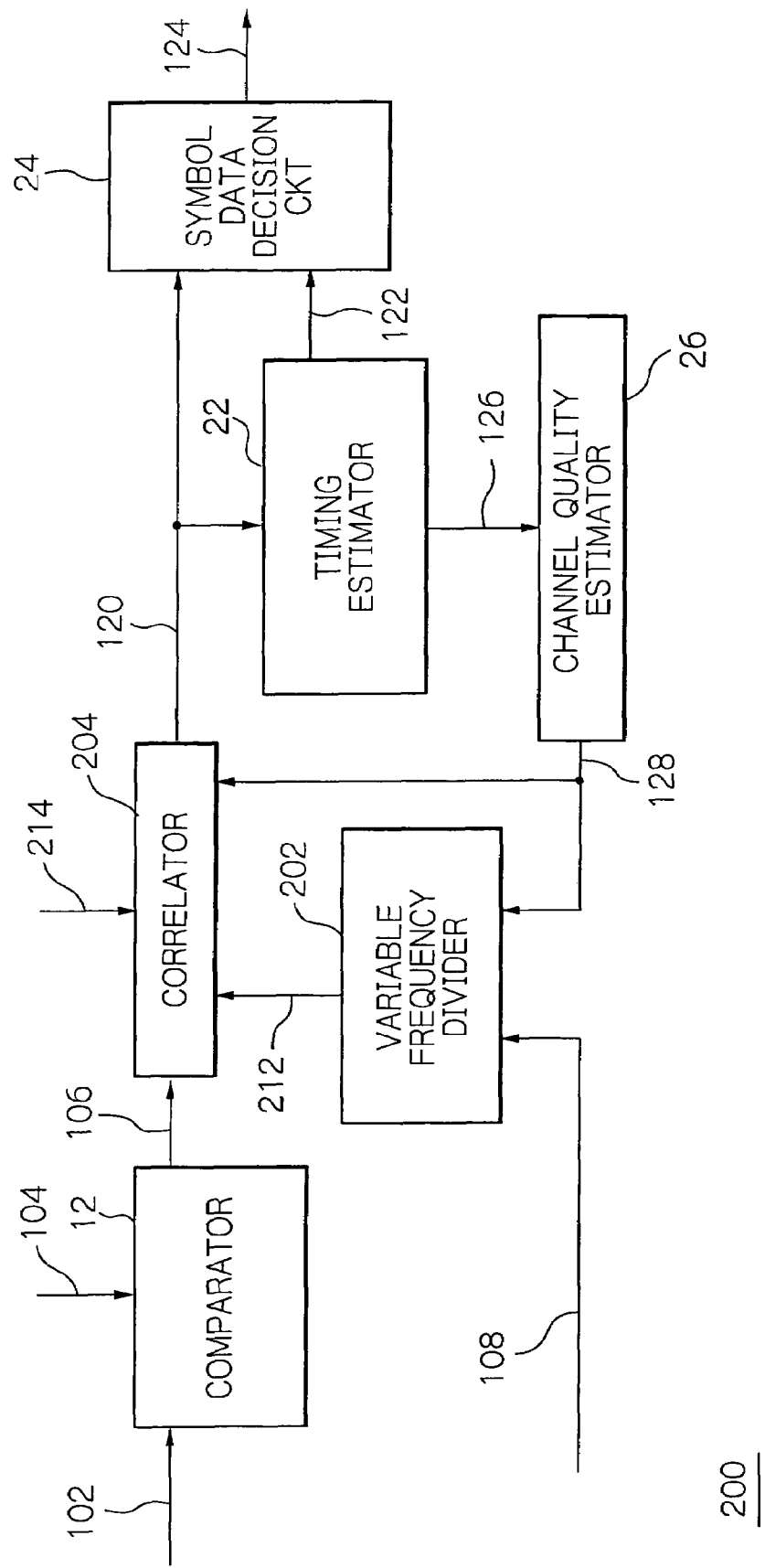
FIG. 4 is a schematic block diagram showing an alternative embodiment of the present invention.

Reference will be made to FIG. 4 for describing an alternative embodiment of the present invention. In FIG. 4, parts and elements like those shown in FIG. 1 are designated by identical reference numerals, and a detailed description thereof will not be made in order to avoid redundancy. As shown, a de-spreading device, generally 200, is also adapted to estimate radio channel quality by the channel quality estimator 26 on the basis of the correlation peak value 126 to output the mode select signal 128 in accordance with the estimated radio channel quality.

In the illustrative embodiment, the de-spreading device 200 includes a variable frequency divider 202, which is adapted to divide the frequency of the master or reference clock signal 108 in response to the mode select signal 128 output from the channel quality estimator 26 for thereby generating an operational clock signal 212. A correlator 204 is provided to determine the correlation of the virtual chip data 106 in response to the operational clock signal 212 output from the variable frequency divider 202.

More specifically, in the illustrative embodiment, the variable frequency divider 202 divides the frequency of the master clock signal 108 selectively by a number, NA or NB, in response to the mode select signal 128. If the divider ratio NA is set to be greater than the other divider ratio NB, then the ratios NA and NB should preferably be assigned to the regular and power-saving modes, respectively.

The correlator 204 is responsive to the operational clock signal 212 to determine the correlation of the virtual chip data 106 output from the comparator 12 by use of a spread code 214 for thereby outputting a correlation value 120. Particularly, in the illustrative embodiment, the correlator 204 is selectively operable in the regular or power-saving mode in response to the mode select signal 128, i.e. adequately operable at a clock frequency matching with the operational mode. The system may preferably adapted to interlock the mode switching thus effected in the correlator 204 to the division ratio switching effected in the variable frequency divider 202.

Figure 5:
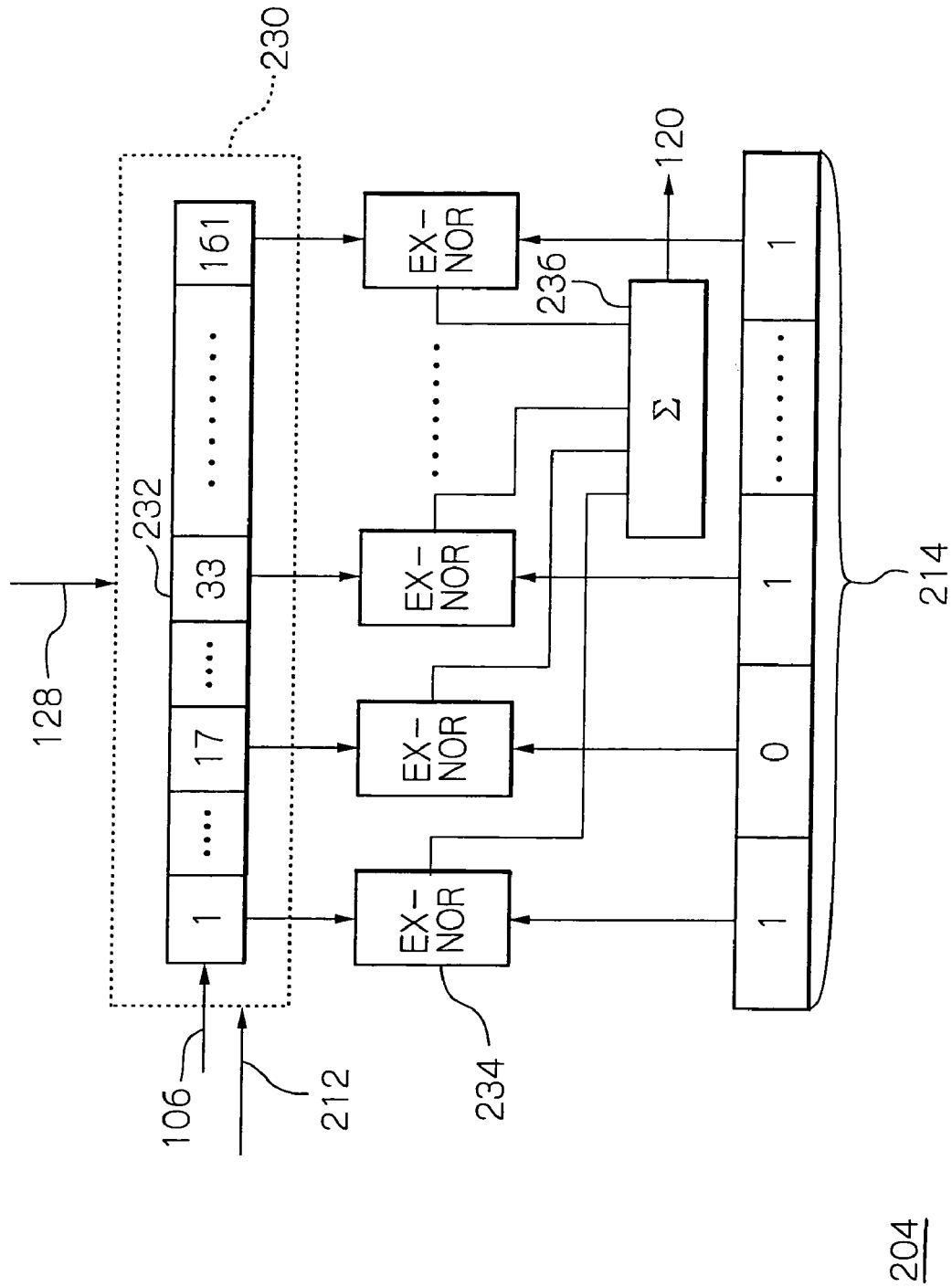
FIG. 5 is a schematic block diagram showing a correlator included in the alternative embodiment shown in FIG. 4 and operating in a regular mode.
Figure 6:
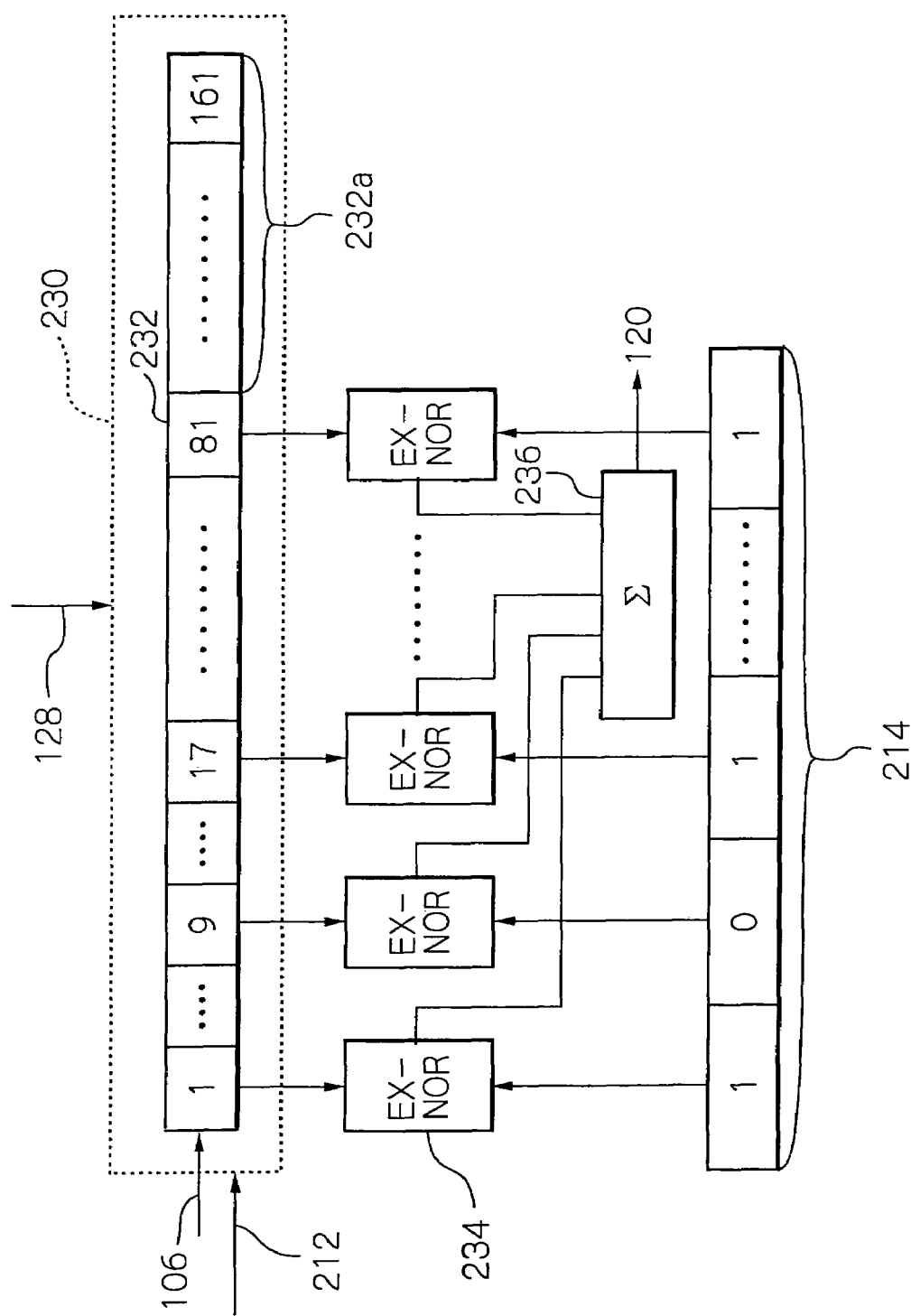
FIG. 6 is a schematic block diagram showing a correlator included in the alternative embodiment and operating in a power-saving mode.

A specific operation of the alternative embodiment will be described hereinafter on the assumption that the correlator 204 is implemented by 1+k×(m−1) consecutive stages 232 of the shift register 230. Again, the number of chips mallocated to a single symbol, i.e. the spread ratio is assumed to be "11". Further, the clock frequency is assumed to be, in the regular mode, sixteen times as high as the chip rate, i.e. k=16, and, in the power-saving mode, eight times as high as the same, i.e. k=8. FIGS. 5 and 6 conceptually show the operating conditions of the correlator 204 to hold in the regular and power-saving modes, respectively. As shown, the correlator 204 is implemented by one hundred and sixty-one consecutive stages of the shift register 230.

First, the comparator 12 compares the detection signal 102 with the preselected threshold value 104. The comparator 12 then outputs virtual chip data 106 which is ONE if the detection signal 102 is greater than or equal to the threshold value 104, or ZERO otherwise, as stated earlier. The virtual chip data 106 are fed to the correlator 204. At this instant, the variable frequency divider 202 divides the frequency of the master clock signal 108 in accordance with the mode indicated by the mode select signal 128. Because the mode select signal 128 is initially indicative of the regular mode, the frequency divider 202 feeds the correlator 204 with an operational clock signal 212 whose frequency is sixteen times as high as the chip rate.

Subsequently, the correlator 204 responds to the mode select signal 128 indicative of the regular mode and uses the spread code 214 to determine the correlation of the virtual chip data 106. More specifically, as shown in FIG. 5, all the 1+k×(m−1) consecutive stages 232 of the shift register 230 of the correlator 204 are enabled in the regular mode in order to sample the virtual chip data 106 at a frequency sixteen times as high as the chip rate, thereby calculating a correlation between eleven values stored in the "1+16×(n−1)" shift register stages 232 (n being 1, 2, . . . , 11) and the spread code 214. The correlation thus calculated is output as a correlation value 120. The correlation value 120 is "11" if the virtual chip data 106 all are identical with the corresponding spread code 214, or "0" if none of the former is identical with the latter. In this manner, the correlation value 120 output from the correlator 204 increases with an increase in the number of chips identical with the spread code 214.

The timing estimator 22, receiving the correlation value 120 output from the correlator 204, detects a peak value 126 appearing around a symbol timing symbol by symbol and feeds the peak value 126 to the channel quality estimator 26. The timing estimator 22 delivers the timing at which the peak value appears to the symbol data decision circuit 24 as an optimum timing signal 122. The correlation value 120 is fed to the symbol data decision circuit 24 as well. The symbol data decision circuit 24 decides the correlation value 120 in response to the optimum timing signal 122 output from the timing estimator 22 and then outputs the correction value 120 as symbol data 124.

The channel quality estimator 26 estimates radio channel quality on the basis of the correlation peak value 126 and then switches the operation mode represented by the mode select signal 128 to one indicative of the estimated radio channel quality. More specifically, when the peak value 126 continuously indicates the spread ratio of "11" over a preselected number of symbols in the regular mode represented by the mode select signal 128, the channel quality estimator 26 determines that radio channel quality is significantly high, and switches the mode select signal 128 from the regular mode to the power-saving mode. The mode select signal 128 thus indicative of the power-saving mode is delivered to the variable frequency divider 202 and correlator 204. In response, the variable frequency divider 202 feeds to the correlator 204 an operational clock signal 212 whose frequency is eight times as high as the chip rate.

The correlator 204 receives the mode select signal 128 indicative of the power-saving mode, and uses the spread code 214 to determine the correlation of the virtual chip data 106. More specifically, as shown in FIG. 6, in the power-saving mode, the first to the "1+8×(m−1)"-th stages 232 of the shift register 230 are all enabled while the remaining shift register stages 232a are disenabled. Consequently, the correlator 204 samples the virtual chip data 106 at a frequency eight times as high as the chip rate, calculates a correlation between eleven values stored in the "1+8×(n−1)" shift register stages 232 (n being 1, 2, . . . , 11) and the spread code 214, and then outputs a correlation value 120 representative of the correlation thus calculated.

On the other hand, if a correlation peak value 126 smaller than the preselected lower limit or threshold is detected when the mode select signal 128 output from the channel quality estimator 26 is indicative of the power-saving mode, then the channel quality estimator 26 switches the mode select signal 128 from the power-saving mode to the regular mode.

As stated above, in the illustrative embodiment, the channel quality estimator 26 determines a correlation peak value 126 to estimate channel quality and then selects either one of the regular mode and power-saving mode to be indicated by the mode select signal 128 in accordance with the channel quality. The variable frequency divider 202 can switch the operational clock signal in response to the mode select signal 128 and cause the correlator 204 to vary the operating condition of the shift registers included therein The illustrative embodiment may also be modified to select a mode having any other sampling frequency for a single symbol that further promotes power consumption. Alternatively, the number of modes available with the illustrative embodiment may be increased to implement more delicate control. In any case, the circuit scale of the illustrative embodiment is determined by the number of shift registers enabled in a mode in which the sampling frequency is highest, so that the number of modes can be increased without scaling up the entire circuitry. More specifically, because the maximum sampling frequency is so determined as to satisfy required reception sensitivity, the circuit scale substantially does not increase even if the number of modes is increased.

In summary, in a de-spreading device of the present invention selectively operable in a regular or power-saving mode, a correlator samples, in the power-saving mode, virtual chip data with a high-frequency operational clock in order to determine a correlation value, thereby bringing the timing of symbol data decision estimated from the peak value of the correlation value closer to the ideal timing. The use of a high-frequency operational clock improves the demodulation characteristic of the de-spreading device. The operational clock can therefore be reduced in rate without affecting demodulation so long as radio channel quality is high enough to free chip data from errors.

More specifically, the frequency of the operational clock signal is lowered if radio channel quality represented by the correlation value is remarkably high, or raised if radio channel quality is lowered. This saves current to be consumed without affecting actual data demodulation and is therefore particularly desirable for the correlator of a de-spreading device including a number of shift registers. Further, the correlator in accordance with the invention will particularly effectively be applicable in terms of electric power consumption to the cases where a spread ratio is significantly large, i.e. numerous shift register stages are required, or a chip rate is high, i.e. an excessively high operational clock rate is required.

Moreover, in accordance with the present invention, a variable frequency divider is used to control not only the operational clock signal frequency but also the operating condition of shift registers constituting a single correlator. Stated another way, a single correlator is used operable with a plurality of operational clock signals, successfully scaling down the entire circuitry. This allows the number of operation modes to be increased without substantially scaling up the circuitry.

The entire disclosure of Japanese patent application No. 2004-217192 filed on Jul. 26, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A de-spreading device comprising:
a comparator for comparing a detection output of a received signal, which is subjected to spectrum spread by a direct sequence system, with a predetermined comparative value to produce virtual chip data;
a frequency divider for dividing a frequency of a master clock signal to generate an operational clock signal;
a correlation circuit for using a predetermined spread code to perform correlation operation on the virtual chip data to produce a correlation value;
a timing estimator for determining a correlation peak value out of the correlation value to produce a timing signal based on the correlation peak value; and
a decision circuit for deciding the correlation value in response to the timing signal and then outputting the correlation value determined as symbol data; and
a channel quality estimator for estimating radio channel quality on a basis of the correlation peak value and selecting one of the plurality of modes in accordance with the radio channel quality estimated;
said de-spreading device being selectively operable in any one of a plurality of modes including a first mode for regular operation and a second mode lower in power consumption than the first mode,
said correlation circuit performing the correlation operation with, in the first mode, a first operational clock signal assigned to the regular operation, and, in the second mode, a second operational clock signal lower in rate than the first operational clock signal,
wherein said channel quality estimator selects the first mode among the plurality of modes in an initial condition, selects the second mode when the radio channel quality estimated is high, or selects the first mode when the radio circuit quality estimated becomes low.

2. The device in accordance with claim 1, wherein said channel quality estimator estimates, when the correlation peak value is representative of a spread ratio, that the radio channel quality is high, estimates, when a high channel quality condition continues over a predetermined number of symbols in the first mode, that the radio channel quality is significantly high, or estimates, when the correlation peak value decreases below a predetermined lower threshold value, that the radio channel quality has become low.

3. A de-spreading device comprising:
a comparator for comparing a detection output of a received signal, which is subjected to spectrum spread by a direct sequence system, with a predetermined comparative value to produce virtual chip data;
a frequency divider for dividing a frequency of a master clock signal to generate an operational clock signal;
a correlation circuit for using a predetermined spread code to perform correlation operation on the virtual chip data to produce a correlation value;
a timing estimator for determining a correlation peak value out of the correlation value to produce a timing signal based on the correlation peak value; and
a decision circuit for deciding the correlation value in response to the timing signal and then outputting the correlation value determined as symbol data; and
a channel quality estimator for estimating radio channel quality on a basis of the correlation peak value and selecting one of the plurality of modes in accordance with the radio channel quality estimated;
said de-spreading device being selectively operable in any one of a plurality of modes including a first mode for regular operation and a second mode lower in power consumption than the first mode, said correlation circuit performing the correlation operation with, in the first mode, a first operational clock signal assigned to the regular operation, and, in the second mode, a second operational clock signal lower in rate than the first operational clock signal, wherein said correlation circuit includes at least a regular correlator for generating a regular correlation value in response to the first operational clock signal, and a power-saving correlator for generating a power-saving correlation value in response to the second operational clock signal, said frequency divider generating the first operational clock signal to feed said regular correlator with the first operational clock signal, and generating the second operational clock signal to feed said power-saving correlator with the second operational clock signal, said regular correlator being, in the first mode, enabled to perform correlation operation in response to the first operational clock signal for outputting the regular correlation value as the correlation value, and, in the second mode, disenabled to perform no correlation operation, said power-saving correlator being, in the first mode, disenabled to perform no correlation operation, and, in the second mode, enabled to perform correlation operation in response to the second operational clock signal for outputting the power-saving correlation value as the correlation value.

4. The device in accordance with claim 3, wherein said correlation circuit includes at least a regular correlator for generating a regular correlation value in response to the first operational clock signal, and a power-saving correlator for generating a power-saving correlation value in response to the second operational clock signal, said frequency divider generating the first operational clock signal to feed said regular coffelator with the first operational clock signal, and generating the second operational clock signal to feed said power-saving correlator with the second operational clock signal, said regular correlator being, in the first mode, enabled to perform correlation operation in response to the first operational clock signal for outputting the regular correlation value as the correlation value, and, in the second mode, disenabled to perform no correlation operation, said power-saving correlator being, in the first mode, disenabled to perform no correlation operation, and, in the second mode, enabled to perform correlation operation in response to the second operational clock signal for outputting the power-saving correlation value as the correlation value.

5. The device in accordance with claim 1, wherein said correlation circuit includes at least a regular correlator for generating a regular correlation value in response to the first operational clock signal, and a power-saving correlator for generating a power-saving correlation value in response to the second operational clock signal, said frequency divider generating the first operational clock signal to feed said regular correlator with the first operational clock signal, and generating the second operational clock signal to feed said power-saving correlator with the second operational clock signal, said regular correlator being, in the first mode, enabled to perform correlation operation in response to the first operational clock signal for outputting the regular correlation value as the correlation value, and, in the second mode, disenabled to perform no correlation operation, said power-saving correlator being, in the first mode, disenabled to perform no correlation operation, and, in the second mode, enabled to perform correlation operation in response to the second operational clock signal for outputting the power-saving correlation value as the correlation value.

6. The device in accordance with claim 2, wherein said correlation circuit includes at least a regular correlator for generating a regular correlation value in response to the first operational clock signal, and a power-saving correlator for generating a power-saving correlation value in response to the second operational clock signal, said frequency divider generating the first operational clock signal to feed said regular correlator with the first operational clock signal, and generating the second operational clock signal to feed said power-saving correlator with the second operational clock signal, said regular correlator being, in the first mode, enabled to perform correlation operation in response to the first operational clock signal for outputting the regular correlation value as the correlation value, and, in the second mode, disenabled to perform no correlation operation, said power-saving correlator being, in the first mode, disenabled to perform no correlation operation, and, in the second mode, enabled to perform correlation operation in response to the second operational clock signal for outputting the power-saving correlation value as the correlation value.

7. The device in accordance with claim 3, wherein said frequency divider generates the first operational clock signal whose sampling frequency for one chip is k1 and the second operational clock signal whose sampling frequency for one chip is k2 lower than k1, assuming that a predetermined number of chips assigned to one symbol in said correlation circuit is m, said regular correlator performing sampling with $1+k1 \times (m-1)$ consecutive shift register stages in response to the first operational clock signal while said power-saving correlator performs sampling with $1+k2 \times (m-1)$ consecutive shift register stages in response to the second operational clock signal, the spread ratio in said channel quality estimator comprising the predetermined number of chips m.

8. A de-spreading device comprising:

a comparator for comparing a detection output of a received signal, which is subjected to spectrum spread by a direct sequence system, with a predetermined comparative value to produce virtual chip data;

a frequency divider for dividing a frequency of a master clock signal to generate an operational clock signal;

a correlation circuit for using a predetermined spread code to perform correlation operation on the virtual chip data to produce a correlation value;

a timing estimator for determining a correlation peak value out of the correlation value to produce a timing signal based on the correlation peak value; and a decision circuit for deciding the correlation value in response to the timing signal and then outputting the correlation value determined as symbol data; and a channel quality estimator for estimating radio channel quality on a basis of the correlation peak value and selecting one of the plurality of modes in accordance with the radio channel quality estimated;

said de-spreading device being selectively operable in any one of a plurality of modes including a first mode for regular operation and a second mode lower in power consumption than the first mode, said correlation circuit performing the correlation operation with, in the first mode, a first operational clock signal assigned to the regular operation, and, in the second mode, a second operational clock signal lower in rate than the first operational clock signal, wherein said frequency divider comprises a variable frequency divider for generating the first operational clock signal in the first mode, and generating the second operational clock signal in the second mode to feed the first operational clock signal or the second operational clock signal to said correlation circuit, said correlation circuit producing and outputting, in the first mode, the correlation value in response to the first operational clock signal, and outputting, in the second mode, the correlation value in response to the second operational clock signal.

9. The device in accordance with claim 1, wherein said frequency divider comprises a variable frequency divider for generating the first operational clock signal in the first mode, and generating the second operational clock signal in the second mode to feed the first operational clock signal or the second operational clock signal to said correlation circuit, said correlation circuit producing and outputting, in the first mode, the correlation value in response to the first operational clock signal, and outputting, in the second mode, the correlation value in response to the second operational clock signal.

10. The device in accordance with claim 1, wherein said frequency divider comprises a variable frequency divider for generating the first operational clock signal in the first mode, and generating the second operational clock signal in the second mode to feed the first operational clock signal or the second operational clock signal to said correlation circuit, said correlation circuit producing and outputting, in the first mode, the correlation value in response to the first operational clock signal, and outputting, in the second mode, the correlation value in response to the second operational clock signal.

11. The device in accordance with claim 2, wherein said frequency divider comprises a variable frequency divider for generating the first operational clock signal in the first mode, and generating the second operational clock signal in the second mode to feed the first operational clock signal or the second operational clock signal to said correlation circuit, said correlation circuit producing and outputting, in the first mode, the correlation value in response to the first operational clock signal, and outputting, in the second mode, the correlation value in response to the second operational clock signal.

12. The device in accordance with claim 8, wherein said variable frequency divider generates, in the first mode, the first operational clock signal whose sampling frequency for one chip is k1, and generates, in the second mode, the second operational clock signal whose sampling frequency for one chip is k2 lower than k1, assuming that a predetermined number of chips assigned to one symbol is m, said correlation circuit enabling, in the first mode, all of 1+k1×(m−1) consecutive shift register stages to perform sampling in response to the first operational clock signal, and disenabling, in the second mode, shift register stages following a "1+k2×(m−1)"-th shift register stage to perform sampling in response to the second operational clock signal, the spread ratio in said channel quality estimator comprising the predetermined number of chips m.

13. The device in accordance with claim 12, wherein the plurality of modes further include another mode different from the first mode and the second mode, said variable frequency divider generating an operational clock signal different from the first operational clock signal and the second operational clock signal, said correlation circuit controlling an operating condition of the shift register stages in response to the other operation mode to perform sampling in accordance with the other mode.

14. A de-spreading method comprising:

a comparing step of comparing a detection output of a received signal, which is subjected to spectrum spread by a direct sequence system, with a predetermined comparative value to produce virtual chip data;

a frequency dividing step of dividing a frequency of a master clock signal to generate an operational clock signal;

a correlation step of using a predetermined spread code to perform correlation operation on the virtual chip data to produce a correlation value;

a timing estimating step of determining a correlation peak value out of the correlation value to produce a timing signal based on the correlation peak value; and a deciding step of deciding the correlation value in response to the timing signal and then outputting the correlation value determined as symbol data;

a step of preparing a plurality of modes including at least a first mode for regular operation and a second mode lower in power consumption than the first mode, said correlation step performing the correlation operation with, in the first mode, a first operational clock signal assigned to the regular operation, and, in the second mode, a second operational clock signal lower in rate than the first operational clock signal; and a channel quality estimating step of estimating radio channel quality on a basis of the correlation peak value and selecting one of the plurality of modes in accordance with the radio channel quality estimated, wherein, in said channel quality estimating step, the first mode is selected among the plurality of modes in an initial condition, the second mode is selected when the radio channel quality estimated is high, and the first mode is selected when the radio circuit quality estimated becomes low.

15. The method in accordance with claim 14, wherein said channel quality estimating step estimates, when the correlation peak value is representative of a spread ratio, that the radio channel quality is high, estimates, when a high channel quality condition continues over a predetermined number of symbols in the first mode, that the radio channel quality is significantly high, and estimates, when the correlation peak value decreases below a predetermined lower threshold value, that the radio channel quality has become low.

16. A de-spreading method comprising:

a comparing step of comparing a detection output of a received signal, which is subjected to spectrum spread by a direct sequence system, with a predetermined comparative value to produce virtual chip data;

a frequency dividing step of dividing a frequency of a master clock signal to generate an operational clock signal;

a correlation step of using a predetermined spread code to perform correlation operation on the virtual chip data to produce a correlation value;

a timing estimating step of determining a correlation peak value out of the correlation value to produce a timing signal based on the correlation peak value; and a deciding step of deciding the correlation value in response to the timing signal and then outputting the correlation value determined as symbol data;

a step of preparing a plurality of modes including at least a first mode for regular operation and a second mode lower in power consumption than the first mode, said correlation step performing the correlation operation with, in the first mode, a first operational clock signal assigned to the regular operation, and, in the second mode, a second operational clock signal lower in rate than the first operational clock signal; and a channel quality estimating step of estimating radio channel quality on a basis of the correlation peak value and selecting one of the plurality of modes in accordance with the radio channel quality estimated, wherein said correlation step includes at least a regular correlation substep of generating a regular correlation value in response to the first operational clock signal, and a power-saving correlation substep of generating a power-saving correlation value in response to the second operational clock signal, said frequency dividing step generating the first operational clock signal to provide the first operational clock signal to said regular correlation step, and generating the second operational clock signal to provide the second operational clock signal to said power-saving correlation step, said regular correlation step being, in the first mode, enabled to perform correlation operation in response to the first operational clock signal for outputting the regular correlation value as the correlation value, and, in the second mode, disenabled to perform no correlation operation, said power-saving correlation step being, in the first mode, disenabled to perform no correlation operation, and, in the second mode, enabled to perform correlation operation in response to the second operational clock signal for outputting the power-saving correlation value as the correlation value.

17. The method in accordance with claim 14, wherein said correlation step includes at least a regular correlation substep of generating a regular correlation value in response to the first operational clock signal, and a power-saving correlation substep of generating a power-saving correlation value in response to the second operational clock signal, said frequency dividing step generating the first operational clock signal to provide the first operational clock signal to said regular correlation step, and generating the second operational clock signal to provide the second operational clock signal to said power-saving correlation step, said regular correlation step being, in the first mode, enabled to perform correlation operation in response to the first operational clock signal for outputting the regular correlation value as the correlation value, and, in the second mode, disenabled to perform no correlation operation, said power-saving correlation step being, in the first mode, disenabled to perform no correlation operation, and, in the second mode, enabled to perform correlation operation in response to the second operational clock signal for outputting the power-saving correlation value as the correlation value.

18. The method in accordance with claim 14, wherein said correlation step includes at least a regular correlation substep of generating a regular correlation value in response to the first operational clock signal, and a power-saving correlation substep of generating a power-saving correlation value in response to the second operational clock signal, said frequency dividing step generating the first operational clock signal to provide the first operational clock signal to said regular correlation step, and generating the second operational clock signal to provide the second operational clock signal to said power-saving correlation step, said regular correlation step being, in the first mode, enabled to perform correlation operation in response to the first operational clock signal for outputting the regular correlation value as the correlation value, and, in the second mode, disenabled to perform no correlation operation, said power-saving correlation step being, in the first mode, disenabled to perform no correlation operation, and, in the second mode, enabled to perform correlation operation in response to the second operational clock signal for outputting the power-saving correlation value as the correlation value.

19. The method in accordance with claim 15, wherein said correlation step includes at least a regular correlation substep of generating a regular correlation value in response to the first operational clock signal, and a power-saving correlation substep of generating a power-saving correlation value in response to the second operational clock signal, said frequency dividing step generating the first operational clock signal to provide the first operational clock signal to said regular correlation step, and generating the second operational clock signal to provide the second operational clock signal to said power-saving correlation step, said regular correlation step being, in the first mode, enabled to perform correlation operation in response to the first operational clock signal for outputting the regular correlation value as the correlation value, and, in the second mode, disenabled to perform no correlation operation, said power-saving correlation step being, in the first mode, disenabled to perform no correlation operation, and, in the second mode, enabled to perform correlation operation in response to the second operational clock signal for outputting the power-saving correlation value as the correlation value.

20. The method in accordance with claim 16, wherein said frequency dividing step generates the first operational clock signal whose sampling frequency for one chip is k1 and the second operational clock signal whose sampling frequency for one chip is k2 lower than k1, assuming that a predetermined number of chips assigned to one symbol in said correlation step is m, said regular correlation step performing sampling with 1+k1×(m−1) consecutive shift register stages in response to the first operational clock signal while said power-saving correlation step performs sampling with 1+k2×(m−1) consecutive shift register stages in response to the second operational clock signal, the spread ratio in said channel quality estimating step comprising the predetermined number of chips m.

21. A de-spreading method comprising:

a comparing step of comparing a detection output of a received signal, which is subjected to spectrum spread by a direct sequence system, with a predetermined comparative value to produce virtual chip data;
a frequency dividing step of dividing a frequency of a master clock signal to generate an operational clock signal;
a correlation step of using a predetermined spread code to perform correlation operation on the virtual chip data to produce a correlation value;
a timing estimating step of determining a correlation peak value out of the correlation value to produce a timing signal based on the correlation peak value; and
a deciding step of deciding the correlation value in response to the timing signal and then outputting the correlation value determined as symbol data;
a step of preparing a plurality of modes including at least a first mode for regular operation and a second mode lower in power consumption than the first mode,
said correlation step performing the correlation operation with, in the first mode, a first operational clock signal assigned to the regular operation, and, in the second mode, a second operational clock signal lower in rate than the first operational clock signal; and
a channel quality estimating step of estimating radio channel quality on a basis of the correlation peak value and selecting one of the plurality of modes in accordance with the radio channel quality estimated,
wherein said frequency dividing step comprises a variable frequency dividing substep for generating the first operational clock signal in the first mode, and generating the second operational clock signal in the second mode to feed the first operational clock signal or the second operational clock signal to said correlation steps,
said correlation step producing and outputting, in the first mode, the correlation value in response to the first operational clock signal, and outputting, in the second mode, the correlation value in response to the second operational clock signal.

22. The method in accordance with claim 14, wherein said frequency dividing step comprises a variable frequency dividing substep for generating the first operational clock signal in the first mode, and generating the second operational clock signal in the second mode to feed the first operational clock signal or the second operational clock signal to said correlation steps,
said correlation step producing and outputting, in the first mode, the correlation value in response to the first operational clock signal, and outputting, in the second mode, the correlation value in response to the second operational clock signal.

23. The method in accordance with claim 14, wherein said frequency dividing step comprises a variable frequency dividing substep for generating the first operational clock signal in the first mode, and generating the second operational clock signal in the second mode to feed the first operational clock signal or the second operational clock signal to said correlation steps,
said correlation step producing and outputting, in the first mode, the correlation value in response to the first operational clock signal, and outputting, in the second mode, the correlation value in response to the second operational clock signal.

24. The method in accordance with claim 15, wherein said frequency dividing step comprises a variable frequency dividing substep for generating the first operational clock signal in the first mode, and generating the second operational clock signal in the second mode to feed the first operational clock signal or the second operational clock signal to said correlation steps,
said correlation step producing and outputting, in the first mode, the correlation value in response to the first operational clock signal, and outputting, in the second mode, the correlation value in response to the second operational clock signal.

25. The method in accordance with claim 21, wherein said variable frequency dividing substep generates, in the first mode, the first operational clock signal whose sampling frequency for one chip is ki, and generates, in the second mode, the second operational clock signal whose sampling frequency for one chip is k2 lower than k1,
assuming that a predetermined number of chips assigned to one symbol is m, said correlation step enabling, in the first mode, all of $1+k1 \times (m-1)$ consecutive shift register stages to perform sampling in response to the first operational clock signal, and disenabling, in the second mode, shift register stages following a "$1+k2 \times (m-1)$"-th shift register stage to perform sampling in response to the second operational clock signal, and
the spread ratio in said channel quality estimating step comprising the predetermined number of chips m.

26. The method in accordance with claim 25, wherein the plurality of modes further include another mode different from the first mode and the second mode,
said variable frequency dividing substep generating an operational clock signal different from the first operational clock signal and the second operational clock signal,
said correlation step controlling an operating condition of the shift register stages in accordance with the other operation mode to perform sampling in accordance with the other mode.

* * * * *